3,640,934
2-PYRROLIDONYL POLYACROLEIN BISULFITE
Nathan D. Field, Allentown, and David I. Randall, Easton, Pa., and Jimmie D. Fitzpatrick, Lafayette, La., assignors to GAF Corporation, New York, N.Y.
No Drawing. Filed Feb. 13, 1969, Ser. No. 799,108
Int. Cl. C08g 9/28
U.S. Cl. 260—29.4 U                                    4 Claims

ABSTRACT OF THE DISCLOSURE

A new composition of matter comprising 2-pyrrolidonyl polyacrolein bisulfite.

---

The instant invention relates to new polymeric materials and to their preparation. In particular the instant invention relates to a new composition of matter comprising 2-pyrrolidonyl polyacrolein bisulfite. Polyacrolein has been prepared in the past by free radical polymerization processes such as are described in Acrolein, Smith, C. W., John Wiley & Sons Inc., New York (1962) page 225, and Schulz, R. C., "Polymerization of Acrolein" in Kinetics and Mechanisms of Polymerization, Ham, G. E., M. Decker, New York, volume 1, part 1—Vinyl Polymerization (1967), page 410. It is also known that unstabilized acrolein spontaneously polymerizes upon standing to produce a solid, non-fusible and insoluble product which has been designated as "disacryl." (Redtenbacher, Liebigs Ann. Chem. 47 (1843), p. 113.)

While polyacrolein has been thought to be useful for several purposes, there have been several difficulties in the handling of same. Particularly, it has in the past been difficult to effect the solution of polyacrolein while simultaneously maintaining its high molecular weight and aldehyde functionality. U.S. Pat. 3,235,524 teaches that high molecular weight free radical polymerized acrolein is insoluble in all common organic solvents. The patent also teaches that a macromolecular infusible insoluble homopolymer of acrolein which is substantially devoid of free aldehyde groups may be converted into a soluble product in aqueous sulfurous acid solutions by reaction with said acid at elevated temperatures. The quantity of acid employed in the reaction is sufficient to dissolve the reaction product.

Further work done in the area has indicated that high molecular weight polyacrolein is insoluble in all organic solvents at a temperature below 80° C. including organic solvents such as dimethyl formamide, N-methyl pyrrolidone, dimethyl sulfoxide, dioxane, benzene and ethyl acetates.

It is an object of the instant invention to provide new polymeric derivatives.

Another object of the instant invention is to provide soluble polymeric derivatives of polyacrolein.

Yet another object of the instant invention is to provide new soluble derivatives of polyacrolein which are particularly useful and valuable for photographic and other industrial uses.

These and other objects of the instant invention will become more evident from the following more detailed description thereof.

We have found that normally insoluble polyacrolein may be made soluble by reacting said polyacrolein with 2-pyrrolidone the commercial "pyrrolidone" as described in our copending application Ser. No. 799,072 filed Feb. 13, 1969. Furthermore, we have discovered that one may produce the bisulfite addition product of 2-pyrrolidonyl polyacrolein by reacting same with aqueous sulfur dioxide, a bisulfite compound and the like. The bisulfite addition product has been found to be an excellent cross-linking agent wherever a water-soluble cross-linking agent is desired. For example, 2-pyrrolidonyl polyacrolein bisulfite may be employed to cross-link polymers such as polyvinyl alcohol, cellulose, polyethylene glycol, and in particular gelatin as disclosed in our copending application, Ser. No. 799,072 filed Feb. 13, 1969.

It has been found that the addition product which results from the reaction of 2-pyrrolidonyl polyacrolein and sulfur dioxide is one in which the pyrrolidonyl moiety is firmly bound to and not replaced by the action of bisulfite. The resulting structure of the new composition of matter is believed to be as follows:

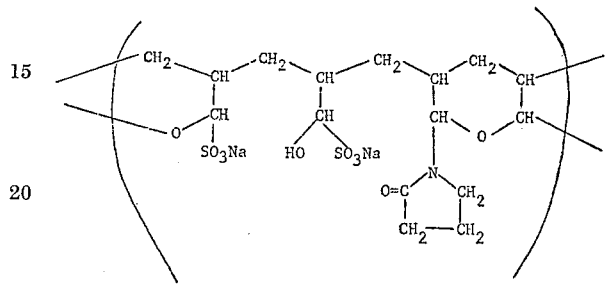

In general the polyacrolein compounds useful in connection with the instant invention in forming pyrrolidonyl polyacrolein include those which are prepared from $\alpha,\beta$-ethylenically unsaturated aldehydes, i.e. those compounds which have an ethylenic group in the $\alpha,\beta$ position relative to the aldehyde group, such as, for example, acrolein, $\alpha$- and $\beta$-substituted acroleins such as $\alpha$-ethylacrolein, $\alpha$-isobutylacrolein, $\alpha$-chloroacrolein, $\beta$-phenylacrolein, $\alpha$-decylacrolein, $\alpha$-cyclohexylacrolein, etc. The preferred aldehydes include alpha, beta-monoethylenically unsaturated monoaldehydes containing from 3 to 12 carbon atoms, and especially the alpha and beta-substituted acroleins wherein the substitutent on the alpha and/or beta positions is an alkyl, cycloalkyl or aryl group containing no more than 8 carbon atoms. 2-alkenals containing up to 8 carbon atoms come under special consideration. These aldehydes may in general be prepared by spontaneous polymerization of acrolein which on standing results in a solid, non-fusible and insoluble product which has been designated as disacryl (Redtenbacher, Liebigs Ann. Chem. 47 (1843) p. 113. Furthermore, as stated above, acrolein polymerizes under the influence of free radical forming catalysts to produce insoluble polymers which are insoluble in the known organic solvents. Suitable catalysts which may be employed include, among others, the peroxides, such as benzoyl peroxide, hydrogen peroxide, potassium persulfate, alkali perborates, diacetyl peroxide, tertiary butyl hydroperoxide, tertiary amyl hydroperoxide, ditertiary butyl peroxide, dietertiary hexyl peroxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like, and azo catalysts such as organic compounds containing an N═N group as alpha, alpha'-azodiisobutyronitril, alpha,alpha'-diisobutyrate, alpha,alpha'-azobis(alpha,gamma-dimethylvaleronitrile), alpha,alpha-azodiisobutyramide, alpha,alpha-azobis(alphacyclopropylpropionitril), alpha-(carbamylazoisobutyronitril), 1,1'-azodicyclohexanecarbonitrile, diazoaminobenzene, 1,1'-azobis-(1-phenylethane), and the like, and various aldoximes, ketoximes, azines and the like.

The suitable bisulfite compounds which may be employed in accordance with the process of this invention can be represented by the generic formula $M(HSO_3)_m$, wherein M designates a metal atom and $m$ is the valance of M. Suitable metal bisulfites include, for example, the bisulfites of metals of Groups I-A, II-A and III-A of the Periodic Table as set forth in the Handbook of Chemistry and Physics, 38th ed., pp. 394-395, such as sodium bisulfide, potassium bisulfite, calcium bisulfite, magnesium bisulfite, aluminum bisulfite, etc. Of these, the alkali metal (Group I-A) bisulfites, and especially sodium bisulfite and potassium bisulfite, are preferred for use in the process of this invention. Similarly, ammonium bisulfite can also be employed. The suspension of the bisulfite can be effected by the incorporation in the diluent of the metal bisulfite as such, or as the corresponding pyrosulfite (metabisulfite) which, upon incorporation, forms the metal bisulfite. In addition one may, as noted above, also use an aqueous solution of sulfur dioxide.

The 2-pyrrolidonyl polyacrolein bisulfite addition product may be prepared by process steps which include bringing into reactive admixture a suspension of 2-pyrrolidonyl polyacrolein and a metal bisulfite of the formula $M(HSO_3)_m$, wherein M is a metal atom and $m$ is the valence or ionic charge of M, in a single-phase liquid diluent consisting essentially of a solution composed of water. The reaction can be illustrated by the equation:

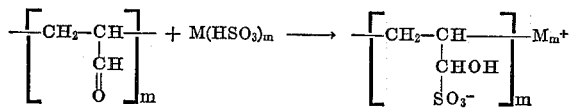

wherein M and $m$ are as defined above. It is to be noted that when M designates a divalent or polyvalent metal, the metal is connected to two or more polymerized acrolein units in the resulting product, depending upon its valence. It is also to be noted that polyacrolein, as is well known to the art, is a complex structure which, it is believed, contains polymerized acrolein units possessing free aldehyde groups, as indicated above, as well as units in which the aldehyde groups are masked in the form of aldehyde hydrate and acetal linkages. See, for instance, the article by Shulz or U.S. Pat. 3,235,524, issued Feb. 15, 1966 to Kern, Schweitzer and Schulz. Under any circumstance, the polymer has been found to react with bisulfite as herein described to form the adducts contemplated by this invention.

The polymers of the above-described unsaturated aldehydes to be employed in preparing the new derivatives of the present invention are those obtained by addition polymerization through the double bond and those having a high molecular weight, i.e., those having a molecular weight above 50,000 and preferably between 100,000 and 2,000,000, said molecular weights being determined by the light scattering technique. The molecular weight range may also be indicated by intrinsic viscosity values as these are usually more easily determined. Preferred polymers are those having intrinsic viscosities (as determined on the solubilized form of the polymer) of at least 0.9 dl./g. and preferably between 0.9 dl./g. and 5.0 dl./g. These values are determined by the conventional techniques of polyelectrolyte viscosity measurements at 25° C.

We have found that when the above-noted high molecular weight polyacroleins are placed in contact with 2-pyrrolidone they dissolve quite readily even up to about 15% by weight. This solubility is attributed to the formation of a new product, 2-pyrrolidonyl polyacrolein. Furthermore, this solution appears to occur without appreciable reduction in the molecular weight of the polyacrolein. Also the aldehyde function is still present, as is evidenced by its ready reaction with aqueous $SO_2$ or sodium bisulfite to form the new bisulfite addition products of the instant invention. The reaction with metal bisulfites is quite surprising since the entire polymer dissolves in water as the bisulfite addition product without the loss of a pyrrolidone moiety.

The reactions according to the invention can be carried out at room temperature but moderately raised temperatures expedite the reactions. Temperatures over 150° C. can engender side reactions which may cause the reaction product to lose its stability. For convenience, it is preferable to employ temperatures not over the normal boiling point of the aqueous sulfurous acid or bisulfite solutions employed for the reaction.

The present invention will now be described by reference to the following specific examples. Such examples are presented for purposes of illustration only, and the thereto.

EXAMPLE 1

25 g. of polyacrolein prepared by redox polymerization of acrolein in an aqueous medium with a redox system composed of potassium persulfate and silver nitrate was added to 475 g. of 2-pyrrolidone and heated to 80° C. with stirring for 4 hours. The resulting viscous yellow solution was filtered through a sintered glass filter. The solution was added to 3 liters of acetone to yield a pale yellow powder which upon drying at room temperature weighed 26.1 g. and analyzed as follows: C, 59.66%; H, 7.54%; and N, 4.54%.

EXAMPLE 1a

Preparation of the polyacrolein

Charged to a 2 l. multinecked spherical flask with stirrer, condenser, thermometer, temperature controller, nitrogen purge, were 1354.4 g. water, 175.1 g. freshly distilled acrolein. This was heated to 45° C. with nitrogen purging. Then, with stirring, was added 25.0 g. potassium persulfate, the nitrogen purge continued, the stirring continued, and the temperature maintained at 45° C. for 2 days. During this time the batch became white and thick with precipitated polyacrolein. The slurry was filtered, washed well on the filter with water, and dried in vacuum oven. Yield 61.2 grams white powder. IR bands at 2.9, 3.42, 5.8, 6.12, 6.86, 7.17, 7.35, 7.52, 9.75, 12.05 microns.

EXAMPLE 2

90 g. of polyacrolein prepared by the method of Example 1 was added to 450 g. of 2-pyrrolidone and heated to 80° C. with stirring for four hours. The procedure of Example 1 was followed and the results obtained were similar thereto. The precipitated 2-pyrrolidonyl polyacrolein was found to be soluble in N-methyl-2-pyrrolidone, pyrrolidone, dimethyl formamide, and hexamethyl phosphoramide. Analysis of the product resulted in the conclusion that a minimum ratio of about 1 pyrrolidone unit per 4 acrolein units were present in the pyrrolidonyl polyacrolein product.

EXAMPLE 2a

Preparation of the 2-pyrrolidonyl polyacrolein 21 g. polyacrolein from Example 1a above and 200 ml. benzene were mixed in a reflux flask, and 28 g. 2-pyrrolidone were added. The batch was refluxed for four hours, the solid filtered off, washed with additional benzene by reslurrying and refiltering, and then dried. This material was found to contain 3.61% nitrogen. This corresponds to 1 pyrrolidone unit reacted per 5.28 acrolein units.

EXAMPLE 3

26.1 g. of 2-pyrrolidonyl polyacrolein prepared according to the method of Example 2 were stirred at room temperature with 225 g. of 8% aqueous sulfur dioxide for four hours. After this time interval complete solution had been effected. The resulting pale yellow solution was then filtered and nitrogen was bubbled therethrough for another four hour interval. The pH of the solution was adjusted to 5.5 by the dropwise addition of 10% by weight sodium hydroxide and the total weight of the final solution was adjusted to 261 g. by the addition of water. An aliquot was then taken and dried under vacuum at 40° C. The resulting pale yellow solid was water-soluble even after heating to 100° C. and gave the following analysis: C, 38.37; H, 5.60; N, 2.49; S, 9.72. This analysis would indicate a sulfur-nitrogen ratio of about 1.7.

EXAMPLE 3a

The product of Example 2a was treated as in Example 3. The pH of the resultant solution was adjusted to pH 5.5.

EXAMPLE 4

Polyacrolein obtained by the method of Example 2 was heated in a concentrated aqueous solution of sodium bisulfite at 60° C. for an interval of about four hours. The resulting yellow solution was filtered and nitrogen was bubbled through the solution for an equal amount of time. The pH was adjusted to 5.5. An aliquot of this solution was then dried under vacuum at 40° C. and the resulting solid was determined to be water-soluble even after heating to 100° C. A chemical analysis showed that the product was similar to that developed by Example 3 and the product had a similar sulfur-nitrogen ratio.

What is claimed is:

1. A high molecular weight-soluble polymer consisting essentially of the reaction product of (1) 2-pyrrolidonyl polyacrolein having a ratio of acrolein units of pyrrolidonyl units of from about 7:1 to about 3:1, and (2) an aqueous solution of sulfur dioxide or a bisulfite of the formula:

$$M(HSO_3)_n$$

wherein M is an ion selected from ammonium and metal ions of Groups I–A, II–A and III–A of the Periodic Table, and $n$ is the valence of M, whereby an addition product is formed between the sulfur dioxide or bisulfite and the available aldehyde groups of said 2-pyrrolidonyl polyacrolein.

2. The polymer of claim 1 wherein the pyrrolidonyl polyacrolein has a nitrogen content of from about 2.5% to about 6%.

3. The polymer of claim 1 wherein said high molecular weight water-soluble polymer is the reaction product of (1) and (2) in water.

4. The polymer of claim 1 wherein said high molecular weight water-soluble polymer is the reaction product of (1) and (2) at a temperature ranging from room temperature to 150° C.

References Cited

UNITED STATES PATENTS

| | | | |
|---|---|---|---|
| 3,121,700 | 2/1964 | Bergman | 260—29.6 |
| 3,177,171 | 4/1965 | Gruber et al. | 260—29.6 |
| 3,235,524 | 2/1966 | Kern et al. | 260—29.6 |
| 3,244,584 | 4/1966 | Stewart et al. | 162—168 |
| 3,258,451 | 6/1966 | Rink et al. | 260—67 |
| 3,317,370 | 5/1967 | Kekish | 162—168 |
| 3,397,172 | 8/1968 | Schuler et al. | 260—72 X |

OTHER REFERENCES

Grant; Hackh's Chemical Dictionary, third edition, 1944, p. 702.

WILLIAM H. SHORT, Primary Examiner

R. J. KOCH, Assistant Examiner

U.S. Cl. X.R.

260—8, 67 UA, 72 R